United States Patent

[11] 3,529,510

[72] Inventors Frank E. Albright;
William W. Bucey, Detroit, Michigan
[21] Appl. No. 740,760
[22] Filed June 27, 1968
[45] Patented Sept. 22, 1970
[73] Assignee Snyder Corporation
Detroit, Michigan
a corporation of Michigan

[54] WORKPIECE FINDER AND BALANCE MECHANISM
25 Claims, 4 Drawing Figs.
[52] U.S. Cl............................................... 90/14,
90/11, 77/5
[51] Int. Cl............................................... B23c 3/00

[50] Field of Search............................................. 90/11,
14; 77/5, 5BC; 51/(Inquired)

[56] References Cited
UNITED STATES PATENTS
2,690,702 10/1954 Romans et al. ............... 90/11
2,962,938 12/1960 De Buigne .................... 90/11
3,004,666 10/1961 Hack ............................ 77/5 (BC)UX Primary Examiner—Gil Weidenfeld
Attorney—Barnes, Kisselle, Raisch and Choate ABSTRACT: A device for weighing and balancing elongated workpieces such as connecting rods in which a first workpiece is weighed and probed for location to obtain information on material removal while material is removed from another workpiece to balance it in a subsequent station.

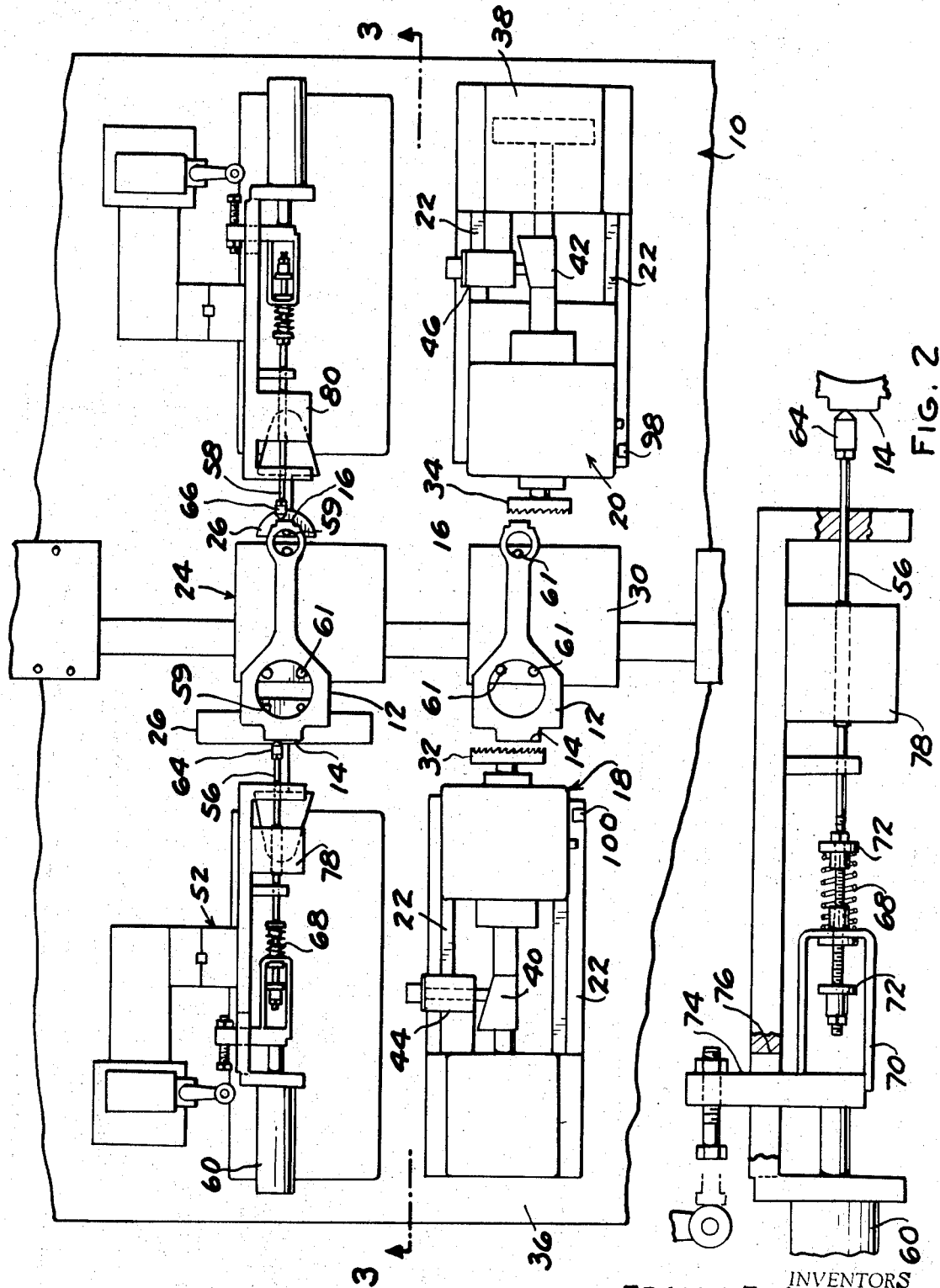

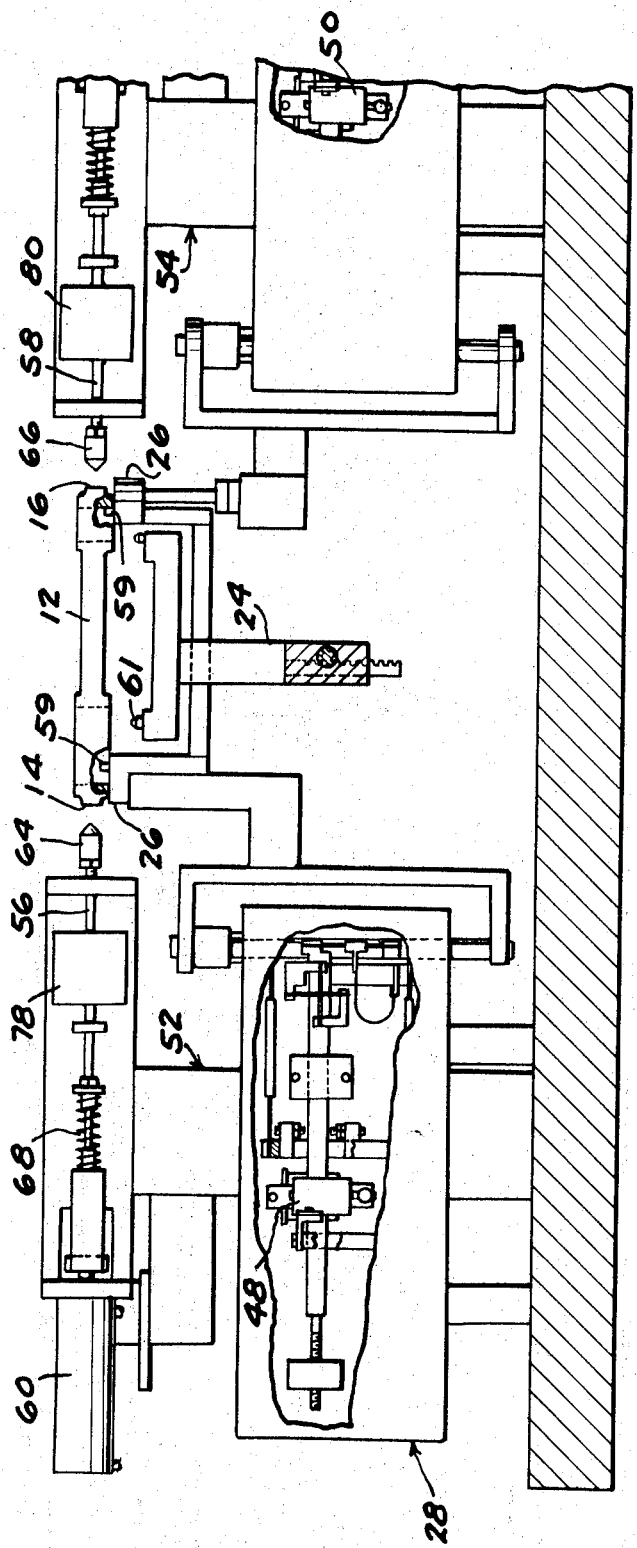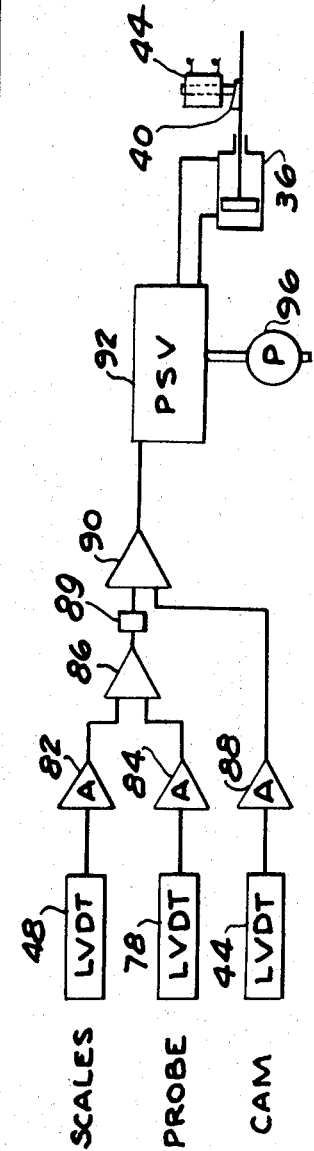

WORKPIECE FINDER AND BALANCE MECHANISM

BACKGROUND OF THE INVENTION

This invention relates to improvements in devices for weighing and balancing workpieces such as connecting rods. Romans et al. U.S. Pat. No. 2,690,702 discloses one such device in which the connecting rod is weighed on double flexure scales in one station, the areas or bosses from which material is to be removed are probed or located and material is removed from the bosses in a second station by a combined probe and milling unit mounted for reciprocal motion with respect to the connecting rods. The advancement of the milling unit or depth of the cut determines the amount of material that is removed from the connecting rod and is controlled, through an appropriate electro-mechanical circuit, by the weight and mass distribution of the connecting rod that is sensed by the scales. The initial starting or reference point from which the milling unit is advanced, so that it will contact and remove material from a connecting rod, is determined by probing the location of the areas or bosses from which material is to be removed. By forming each connecting rod with bosses of uniform cross-sectional area, the amount of material removed from the connecting rod will be proportional to the depth of the cut.

In short, in the Romans et al. device the probe determines the location of the edge of each boss and the scale signals determine the extent to which each milling unit should be advanced beyond the edge of the boss and fed into the workpiece. It is always assumed that the connecting rods are formed so that some material must be removed from each end to balance and arrive at the desired weight and mass distribution of the finished connecting rod.

In the disclosed invention the function of probing the bosses on a workpiece is physically and structurally separated from the material removal or milling function. The separation of these two functions allows one workpiece to be probed while the material removal or milling function is being performed on another workpiece. This arrangement allows this invention to balance substantially more connecting rods per hour than most prior art devices. This arrangement also simplifies the structural components of this invention and reduces the cost of manufacturing the device. By combining the probing and weighing functions in a single station, the production capacity of the device is further increased and the manufacturing cost is reduced.

In the preferred embodiment of this device electrical signals from the probes and the scale are used to determine the point at which the material removal or milling functions ceases, not where it begins. Unlike the Romans et al. device, the operator does not have to transfer a workpiece from the scales to the loading station; rather, he loads the workpiece and it is automatically transferred through the device. This results in an operator time savings and reduces the chance of human error in the operation of the device.

DESCRIPTION OF THE INVENTION

This invention relates to workpiece finding and balancing mechanisms and more particularly to a device for determining the weight and distribution of mass of an elongated workpiece such as a connecting rod.

A principal object of this invention is to reduce the cycle time of an apparatus that initially measures and subsequently alters the weight and mass distribution of an elongated workpiece.

Another object of this invention is to reduce the amount of machine operator time that is required to produce a balanced elongated workpiece.

Another object of this invention is to provide a relatively inexpensive, flexible and structurally simplified workpiece balancing apparatus.

Another object of this invention is to provide a workpiece balancing apparatus which is subject to fewer operator induced errors and inaccuracies than some other balancing apparatus.

Another object of this invention is to provide a balancing apparatus in which one workpiece can be weighed while material is being removed from another workpiece.

Another object of this invention is to provide a balancing apparatus which limits the maximum amount of material removed from a workpiece.

Other objects and features of this invention will be apparent from the following description and claims which disclose the manner of making and using the invention in the best mode contemplated by the inventors for carrying out the invention.

Drawings accompany this disclosure and the various views thereof may be described as:

FIG. 1, a top view of an apparatus for measuring and altering the weight and mass distribution of an elongated workpiece.

FIG. 2, an enlarged fragmentary view of a portion of FIG. 1.

FIG. 3, a sectional view on line 3—3 of FIG. 1.

FIG. 4, a block diagram of a control system for the sensing and material removal devices of the apparatus of FIG. 1.

REFERRING TO THE DRAWINGS

In FIG. 1, a machine designated generally as 10 for determining and altering the weight and the center of gravity or balance of a connecting rod 12 with bosses 14 and 16 is shown. In general, machine 10 has two milling units 18 and 20 mounted on suitable ways 22 for reciprocal motion in a direction parallel to the longitudinal axis of bosses 14, 16, a transfer bar 24 for moving workpiece 12 generally vertically upward from platforms 26 of a scale 28 and horizontally forward and generally vertically downward on to a workstation 30 where cutters 32, 34 mounted on milling units 18 and 20 can remove a portion of the material from bosses 14 and 16 of workpiece 12. Machines of this general type for weighing an elongated workpiece and removing a portion of the material of the workpiece so that it will be properly balanced are known in the prior art and one specific embodiment of this general type of machine is disclosed in the Romans et al. U.S. Pat. No. 2,690,702.

In machine 10 hydraulic cylinders 36, 38 control both the rate of feed or travel and position of the milling units 18, 20. A cam 40 is attached to milling unit 18 and a cam 42 is attached to milling unit 20; each cam respectively actuates a linear variable differential transformer 44, 46 which translates the position and displacement of each milling unit 18, 20 into an electrical signal.

As shown in FIG. 3, a double flexure scale unit 28 which is of standard construction such as Assembly No. 4461 of the Exact Weight Scale Co., 538 East Town St., Columbus, Ohio 43215 has a displacement sensing means such as a linear variable differential transformer 48, 50 mounted on each one of its arms. Transformers 48, 50 translate the displacement of each arm of scale unit 28, that is caused by the mass of workpiece 12, into an electrical signal. As used in this specification and claims, the term "scale" refers to a device which determines the static imbalance of a workpiece and indicates the amount of material that should be removed to achieve a static balance of the workpiece. Such a scale usually indicates the amount of material that should be removed to achieve both a static balance and a predetermined overall weight of a workpiece, not the gross weight of the workpiece. Positioned transversely to scale 28 are two base units 52, 54 each having mounted thereon for reciprocal motion a probe 56, 58. Probes 56, 58 are positioned so that they will contact the end surfaces of bosses 14 and 16 of workpiece 12 when it is placed on scale 28 and probes 56, 58 are extended toward connecting rod 12 by cylinder actuating means 60, 62. Each probe 56, 58 has a pointed tip 64, 66 which provides a minimal area of contact between probes 56, 58 and workpiece 12 so that scale 28 is not disturbed or oscillated when the probes contact workpiece 12 resting on platforms 26 of the scale. As shown in FIG. 2, each probe 56, 58 is provided with a lost motion means comprised of a spring 68, suitable mounts 70, and retainers 72 to further reduce the chance of inducing extraneous oscillations in scale 28 when the probes contact the workpiece. Preferably, springs 68 and the lost motion means are designed so that probes 56, 58 apply only a 5 to 10 pound force to workpiece 12 when cylinders 60, 62 are fully extended. To prevent over-travel of the air cylinder and lost motion means, mounts 70 are provided with positive stops 74 which strike a portion 76 of the bases. A means of sensing the displacement of each probe 56, 58 relative to its base unit 52, 54 such as a linear variable differential transformer 78, 80 is mounted on each base unit 52, 54 and is actuated by its probe 56, 58.

Pins 59 on scale platforms 26 accurately position connecting rod 12 on the double flexure scale by locating rod 12 from its accurately machined and inherently critical crank and wrist pin bores. Pins 59 also accurately locate connecting rod 12 relative to probes 56, 58. Pins 61 assure that connecting rod 12 assumes the same location with respect to milling units 18, 20 as the location that it assumed with respect to probes 56, 58 and scale platforms 26. This arrangement improves the overall accuracy of the balancing apparatus by assuring that workpiece 12 assumes the same position with respect to scale 28, probes 56, 58 and milling units 18, 20 even though the workpiece is transferred from one workstation to another.

A block diagram of a control circuit for this machine is shown in FIG. 4. A signal from scale weight sensing LVDT 48 and a signal from LVDT 78 of probe 56 are amplified by linear amplifiers 82, 84 and fed to a summing amplifier 86. A signal from LVDT 44 mounted on milling unit 18 and actuated by cam 40 is amplified by a linear amplifier 88. The signal from the summing amplifier 86 and the signal from the linear amplifier 88 are fed into a differential detector 90 which activates a proportional servo-valve 92 which controls the displacement of cylinder 36 and hence the feed and position of milling unit 18. A second circuit similar to the first and utilizing a signal from weight sensing LVDT 50, a signal from LVDT 80 of probe 58 and a signal from LVDT 42 attached to milling unit 20 and actuated by cam 42 activates a proportional servo-valve 94 which controls the displacement of cylinder 38 and hence the feed and position of milling unit 20. If, as in the preferred embodiment of this apparatus, the connecting rod is simultaneously both probed and weighed, a single temporary storage unit or memory 89 such as an electrolytic capacitor is used with each summing amplifier 86. The memory will hold the sum of the scale and probe signals while workpiece 12 is transferred from platforms 26 of the scale to the milling station and also while milling units 18, 20 are advanced to remove material from workpiece bosses 14, 16. When the signal from the memory of a summing amplifier 86 is nulled with the signal from its associated cam signal amplifier by a detector 90, proportional servo-valve 92 reverses the direction of flow in its associated cylinder 36 or 38 which retracts milling unit 18 or 20. Alternatively, detector 90 can be used to position a movable positive stop for the milling unit so that the milling unit feeds into the workpiece until it abuts with the positive stop. If a workpiece is sequentially weighed and probed for location of the bosses, it is also necessary to use a memory for either the scale amplifier signal 82 or the probe amplifier signal 84 depending on whether the workpiece is weighed or probed first. In this situation either the scale or probe amplifier signal is held by the memory while the other operation is performed. Scale and probe amplifier signals are then summed by summing amplifier 86. From this point on the circuit is the same as the preferred embodiment. Linear amplifiers 82, 84, 88 allow the output signals of the scale, probe and cam LVDTs to be scaled relative to each other so that an equal change in the potential of each of the output signals represents an equal mass of material or weight to be removed from the workpiece. A hydraulic pump 96 and appropriate valving, all well known in the prior art, provides the power source and means of control for this machine.

To operate this device a workpiece is placed on platforms 26 of scales 28 causing the displacement of the beams of the scale to be translated into an electrical signal by LVDTs 48, 50. Placing of workpiece 12 on platforms 26 of scale 28 also activates cylinders 60, 62 causing probes 56, 58 to contact bosses 14, 16 of workpiece 12. Displacement of probes 56, 58 is translated into an electrical signal by LVDTs 78, 80. The electrical signal from the scale and from the probes, through the appropriate electrical circuits and proportional servo-valves, provides a means of controlling and positioning cylinders 36, 38 which activate and control the feed and position of milling units 18 and 20. After workpiece 12 has been probed and weighed, probes 56, 58 are retracted and workpiece 12 is transferred by transfer mechanism 24 to workstation 30 where milling units 18, 20 are fed into bosses 14, 16 of transferred workpiece 12. The total distance that each milling unit is fed into bosses 14, 16 is determined by the probe and scale signals and the feed of the milling units determines the amount of material that is removed from bosses 14, 16 of the workpiece.

Separation of the probing for location of the bosses function from the milling or material removal function substantially simplifies and reduces the manufacturing cost of the milling units in the weighing and balancing apparatus. Such a separation of functions also allows the material removal function to be performed on one workpiece while another workpiece is being weighed and probed to determine how much material should be removed and how far the milling units will have to be traversed or fed to remove the material. This allows the cycle time of the apparatus to be substantially reduced which results in increased production capacity of the weighing and balancing apparatus. By combining the weighing and probing functions in a single station, the cost of manufacturing a weighing and balancing apparatus is significantly reduced. If a workpiece is simultaneously weighed and probed, the cycle time of the apparatus is decreased and its production capacity is accordingly increased.

In the preferred embodiment of this apparatus, LVDTs 78, 80 are arranged so that their zero reference point corresponds with the position that probes 56, 58 would assume if they were in contact with the bosses 14, 16 of a workpiece which had the maximum permissible amount of material removed from them. The maximum amount of material that can be removed from a boss of a connecting rod is determined by the structural design requirements of the connecting rod. In the preferred embodiment of this apparatus LVDTs 78, 80 are arranged so that the absolute numerical value of their output signal increases as the probes are retracted from the zero reference point or move away from the workpiece. LVDTs 78, 80 are also arranged so that their output signal has the opposite sign of the output signal of LVDTs 48, 50 which are arranged on the scale 28 so that the absolute value of their output signal increases as the amount of material to be removed is increased. With this arrangement the algebraic sum of the probe and scale signals as determined by a summing amplifier 86 represents the end point of the travel of a milling unit 18, 20 when it is removing material from a boss 14, 16. In short, in the preferred embodiment of this apparatus the scale and probe LVDTs are arranged so that the end point of the material removal function is determined, not the beginning or starting point. With this arrangement the sign of the output of a summing amplifier 86 can be used to limit the travel of a milling unit 18, 20 so that it does not remove material beyond the zero reference point determined by the structural requirements of the connecting rod or workpiece 12. The travel of milling units 18, 20 can also be limited by positive stops 98, 100.

We claim:
1. A device for weighing and balancing workpieces comprising, material removal means for reducing the weight and altering the distribution of mass of workpieces by removing material from at least one predetermined area of the workpieces, scale means sensing the amount of material to be removed from workpieces to balance the workpieces, said scale means being adapted to function on one workpiece prior to said material removal means removing material from said one workpiece and while removing material from another workpiece, at least one locating means sensing the position of the area of said one workpiece prior to said material removal means removing material from said one workpiece and while removing material from another workpiece, and control means using both the sensing of said scale means and said locating means to control the amount of material removed from said area of said one workpiece by said material removal means.

2. The device for weighing and balancing workpieces as defined in claim 1 in which said scale means and said locating means operate sequentially on said one workpiece.

3. The device for weighing and balancing workpieces as defined in claim 2 in which both said scale means and said locating means are in a first work station and said material removal means is in a second work station, whereby said one workpiece can be transferred directly from said first station to said second station of the device thereby reducing the time required to process workpieces.

4. The device for weighing and balancing workpieces as defined in claim 1 in which both said scale means and said locating means are in a first work station and operate substantially simultaneously and said material removal means is in a second work station of the device, whereby said workpiece can be transferred directly from the first station to the second station of the device thereby reducing the time required to process workpieces.

5. The device for weighing and balancing workpieces as defined in claim 1 in which said scale means comprises a double flexure scale having at least two arms, and said control means includes means translating the motion of said arms into electrical signals which vary with and are proportional to the displacement of said arms.

6. The device for weighing and balancing workpieces as defined in claim 1 in which the material removal means comprises milling units mounted for reciprocal motion relative to each of said predetermined areas of said workpieces, and said control means includes a means translating the displacement of said milling units relative to said predetermined areas into an electrical signal which varies with and is proportional to said displacement.

7. The device for weighing and balancing workpieces as defined in claim 5 in which the material removal means comprises milling units mounted for reciprocal motion relative to each of said predetermined areas of said workpieces, and said control means includes a means translating the displacement of said milling units relative to said predetermined areas into an electrical signal which varies with and is proportional to said displacement.

8. The device for weighing and balancing workpieces as defined in claim 1 in which said locating means comprises movable probe means positioned for displacement into contact with said predetermined areas of said workpieces, and said control means includes means translating the displacement of said probe means into an electrical signal which varies with and is proportional to said displacement.

9. The device for weighing and balancing workpieces as defined in claim 2 in which said locating means comprises movable probe means positioned for displacement into contact with said predetermined areas of said workpieces, and said control means includes means translating the displacement of said probe means into an electrical signal which varies with and is proportional to said displacement.

10. The device for weighing and balancing workpieces as defined in claim 4 in which said locating means comprises movable probe means positioned for displacement into contact with said predetermined areas of said workpieces, and said control means includes means translating the displacement of said probe means into an electrical signal which varies with and is proportional to said displacement.

11. The device for weighing and balancing workpieces as defined in claim 5 in which said locating means comprises movable probe means positioned for displacement into contact with said predetermined areas of said workpieces, and said control means includes means translating the movement of said probe means into an electrical signal which varies with and is proportional to said displacement.

12. The device for weighing and balancing workpieces as defined in claim 6 in which said locating means comprises movable probe means positioned for displacement into contact with said predetermined areas of said workpieces, and said control means includes means translating the displacement of said probe means into an electrical signal which varies with and is proportional to said displacement.

13. The device for weighing and balancing workpieces as defined in claim 7 in which said locating means comprises movable probe means positioned for displacement into contact with said predetermined areas of said workpieces, and said control means includes means translating the displacement of said probe means into an electrical signal which varies with and is proportional to said displacement.

14. The device for weighing and balancing workpieces as defined in claim 1 in which said locating means and control means comprises:
 a. a base unit for each predetermined area of the workpiece to be located;
 b. a probe mounted on each base unit for reciprocal motion and positioned to contact said predetermined area when actuated;
 c. a means of sensing the displacement of each probe relative to its base unit having a means of translating the relative displacement of the probe into an electrical signal which varies with and is proportional to the displacement; and
 d. a means of actuating each probe for motion relative to its base unit, whereby the actuator means urges each probe into contact with its corresponding predetermined area of the workpiece and the probe displacement sensing means indicates the displacement of the probe relative to the base.

15. The device for weighing and balancing workpieces as defined in claim 1 in which said control means includes means translating the sensing of said scale means into an electrical signal varying with and proportional to the amount of material to be removed from the areas of said one workpiece, and means translating the sensing of said locating means into an electrical signal varying with and proportional to the position of the areas of said one workpiece, whereby both of said electrical signals are used in controlling the amount of material removed by said material removal means from said one workpiece.

16. The device for weighing and balancing workpieces as defined in claim 2 in which said control means includes means translating the sensing of said scale means into an electrical signal varying with and proportional to the amount of material to be removed from the areas of said one workpiece, and means translating the sensing of said locating means into an electrical signal varying with and proportional to the position of the areas of said one workpiece, whereby both of said electrical signals are used in controlling the amount of material removed by said material removal means from said one workpiece.

17. The device for weighing and balancing workpieces as defined in claim 3 in which said control means includes means translating the sensing of said scale means into an electrical signal varying with and proportional to the amount of material to be removed from the areas of said one workpiece, and means translating the sensing of said locating means into an electrical signal varying with and proportional to the position of the areas of said one workpiece, whereby both of said electrical signals are used in controlling the amount of material removed by said material removal means from said one workpiece.

18. The device for weighing and balancing workpieces as defined in claim 4 in which said control means includes means translating the sensing of said scale means into an electrical signal varying with and proportional to the amount of material to be removed from the areas of said one workpiece, and means translating the sensing of said locating means into an electrical signal varying with and proportional to the position of the areas of said one workpiece, whereby both of said electrical signals are used in controlling the amount of material removed by said material removal means from said one workpiece.

19. The device for weighing and balancing workpieces as defined in claim 15 in which said control means includes means translating the amount of material removed from the area of said one workpiece by said material removal means into an electrical signal variable with and proportional to the amount of material removed from said one workpiece, said electrical signal being nulled with both said scale sensing and locating electrical signals to control the amount of material removed by said material removal means from said one workpiece.

20. The device for weighing and balancing workpieces as defined in claim 16 in which said control means includes means translating the amount of material removed from the area of said one workpiece by said material removal means into an electrical signal variable with and proportional to the amount of material removed from said one workpiece, said electrical signal being nulled with both said scale sensing and locating electrical signals to control the amount of material removed by said material removal means from said one workpiece.

21. The device for weighing and balancing workpieces as defined in claim 17 in which said control means includes means translating the amount of material removed from the areas of said one workpiece by said material removal means into an electrical signal variable with and proportional to the amount of material removed from said one workpiece, said electrical signal being nulled with both said scale sensing and locating electrical signals to control the amount of material removed by said material removal means from said one workpiece.

22. The device for weighing and balancing workpieces as defined in claim 18 in which said control means includes means translating the amount of material removed from the areas of said one workpiece by said material removal means into an electrical signal variable with and proportional to the amount of material removed from said one workpiece, said electrical signal being nulled with both said scale sensing and locating electrical signals to control the amount of material removed by said material removal means from said one workpiece.

23. The device for weighing and balancing workpieces as defined in claim 15 in which the scale translating means is arranged so that the absolute value of its electrical signal increases as the amount of material to be removed from said one workpiece as indicated by the scale means increases, and the locating translating means is arranged so that the absolute value of its electrical signal increases as said locating means moves away from the area of said one workpiece and said electrical signals of said scale and locating translating means are of opposite sign, whereby the algebraic sum of said signals determines the point at which said material removal means ceases to remove material from said workpiece.

24. The device for weighing and balancing workpieces as defined in claim 15 in which said control means includes a storage unit for holding the sum of said scale electrical signal and said locating electrical signal, whereby said scale means and said locating means can operate on other workpieces while said material removal means removes material from said one workpiece.

25. The device for weighing and balancing workpieces as defined in claim 16 in which said control means includes a storage unit for holding the sum of said scale electrical signal and said locating electrical signal, whereby said scale means and said locating means can operate on other workpieces while said material removal means removes material from said one workpiece.